United States Patent
Tang et al.

(10) Patent No.: US 10,699,170 B2
(45) Date of Patent: Jun. 30, 2020

(54) APPARATUSES AND METHODS FOR SEMANTIC IMAGE LABELING

(71) Applicant: Beijing SenseTime Technology Development Co., Ltd, Beijing (CN)

(72) Inventors: Xiaoou Tang, Shatin (CN); Ziwei Liu, Shatin (CN); Xiaoxiao Li, Shatin (CN); Ping Luo, Shatin (CN); Chen Change Loy, Shatin (CN)

(73) Assignee: Beijing SenseTime Technology Development Co., Ltd., Beijing (CN)

( * ) Notice: Subject to any disclaimer, the term of this patent is extended or adjusted under 35 U.S.C. 154(b) by 99 days.

(21) Appl. No.: 15/864,142

(22) Filed: Jan. 8, 2018

(65) Prior Publication Data

US 2018/0129919 A1    May 10, 2018

Related U.S. Application Data

(63) Continuation of application No. PCT/CN2015/083537, filed on Jul. 8, 2015.

(51) Int. Cl.
*G06K 9/72* (2006.01)
*G06K 9/66* (2006.01)
(Continued)

(52) U.S. Cl.
CPC ........... *G06K 9/726* (2013.01); *G06K 9/4628* (2013.01); *G06K 9/6262* (2013.01);
(Continued)

(58) Field of Classification Search
CPC ............ G06K 9/00362; G06K 9/4628; G06K 9/6292; G06K 9/00973; G06K 9/34;
(Continued)

(56) References Cited

U.S. PATENT DOCUMENTS

| 10,127,475 | B1* | 11/2018 | Corrado | ............... G06K 9/6256 |
| 10,181,091 | B2* | 1/2019 | Song | .................... G06K 9/6212 |
| 2002/0034330 | A1* | 3/2002 | Lennon | .................. G06T 7/143 |
| | | | | 382/228 |
| 2009/0083010 | A1* | 3/2009 | Qi | ....................... G06F 16/7847 |
| | | | | 703/2 |

(Continued)

FOREIGN PATENT DOCUMENTS

| CN | 104616032 | 5/2015 |
| CN | 104732243 | 6/2015 |

OTHER PUBLICATIONS

International Search Report of PCT/CN2015/083537 dated Sep. 25, 2015, 3 pp.

(Continued)

*Primary Examiner* — Aklilu K Woldemariam
(74) *Attorney, Agent, or Firm* — Lathrop GPM LLP (57) ABSTRACT

Disclosed is a method for generating a semantic image labeling model, comprising: forming a first CNN and a second CNN, respectively; randomly initializing the first CNN; inputting a raw image and predetermined label ground truth annotations to the first CNN to iteratively update weights thereof so that a category label probability for the image, which is output from the first CNN, approaches the predetermined label ground truth annotations; randomly initializing the second CNN; inputting the category label probability to the second CNN to correct the input category label probability so as to determine classification errors of the category label probabilities; updating the second CNN by back-propagating the classification errors; concatenating the updated first and second CNNs; classifying each pixel in the raw image into one of general object categories; and back-propagating classification errors through the concatenated CNN to update weights thereof until the classification errors less than a predetermined threshold.

17 Claims, 8 Drawing Sheets

(51) Int. Cl.
*G06K 9/62* (2006.01)
*G06K 9/68* (2006.01)
*G06N 3/08* (2006.01)
*G06N 3/04* (2006.01)
*G06K 9/46* (2006.01)

(52) U.S. Cl.
CPC ............. *G06K 9/6263* (2013.01); *G06K 9/66* (2013.01); *G06K 9/685* (2013.01); *G06N 3/0454* (2013.01); *G06N 3/084* (2013.01); *G06N 3/0445* (2013.01)

(58) Field of Classification Search
CPC ...... G06K 9/6262; G06K 9/6263; G06K 9/66; G06K 9/685; G06K 9/726; G06K 9/00147; G06K 9/6267; G06K 9/6296; G06K 2009/6213; G06K 2209/15; G06K 9/00355; G06K 9/00536; G06K 9/6202; G06K 9/628; G06K 2209/21; G06K 9/3233; G06K 9/6231; G06K 9/6256; G06K 9/00758; G06K 9/00771; G06K 9/6215; G06K 9/6218; G06K 9/00214; G06K 9/50; G06T 2207/20081; G06T 7/11; G06T 2207/20084; G06T 5/10; G06T 2207/10016; G06T 2207/10024; G06T 2207/20016; G06T 7/10; G06T 7/143; G06T 2207/20076; G06T 17/00; G06T 7/55; G06F 16/55; G06F 16/353; G06N 3/0454; G06N 3/08; G06N 5/046; G06N 3/084; G06N 20/00; A61B 6/504; A61B 5/7267; G07G 1/0072; G16H 50/20
USPC ................ 382/103, 138, 140, 159, 199, 224
See application file for complete search history.

(56) References Cited

U.S. PATENT DOCUMENTS

| | | | |
|---|---|---|---|
| 2014/0003708 A1* | 1/2014 | Datta | G06K 9/6256 382/159 |
| 2015/0139485 A1 | 5/2015 | Bourdev | |
| 2015/0347860 A1* | 12/2015 | Meier | G06K 9/72 382/140 |
| 2015/0347861 A1* | 12/2015 | Doepke | H04N 5/23245 382/199 |
| 2016/0055237 A1* | 2/2016 | Tuzel | G06F 16/353 382/224 |
| 2016/0171340 A1* | 6/2016 | Fleishman | G06K 9/00375 382/159 |
| 2016/0180195 A1* | 6/2016 | Martinson | G06N 3/0472 382/103 |
| 2016/0358337 A1* | 12/2016 | Dai | G06T 5/10 |

OTHER PUBLICATIONS

Khalil-Hani, Mohamed et al. "A Convolutional Neural Network Approach for Face Verification" High Performance Computing & Simulation (HPCS), 2014 International Conference on, Aug. 25, 2014 (Aug. 25, 2014), the whole document.

Menotti, D. et al. "Vehicle License Plate Recognition With Random Convolutional Networks," Graphics, Patterns and Images (SIBGRAPI), 2014 27th SIBGRAPI Conference on, Aug. 30, 2014 (Aug. 30, 2014), the whole document.

Verma, Ankit et al. "Using Convolutional Neural Networks to Discover Cognitively Validated Features for Gender Classification" Soft Computing and Machine Intelligence (ISCMI), 2014 International Conference on, Sep. 27, 2014 (Sep. 27, 2014), the whole document.

* cited by examiner

APPARATUSES AND METHODS FOR SEMANTIC IMAGE LABELING

CROSS-REFERENCE TO RELATED APPLICATIONS

This is an application continuation of PCT/CN2015/083537, filed on Jul. 8, 2015 and entitled "An Apparatus and a Method for Semantic Image Labeling," the entire disclosure of which is hereby incorporated by reference.

TECHNICAL FIELD

The disclosures relate to an apparatus and a method for semantic image labeling.

BACKGROUND

Markov Random Field (MRF) or Conditional Random Field (CRF) has achieved great successes in semantic image labeling, which is one of the most challenging problems in computer vision. Existing works can be generally categorized into two groups based on their definitions of the unary and pairwise terms of MRF.

In the first group, researchers improved labeling accuracy by exploring rich information to define the pairwise functions, including long-range dependencies, high-order potentials, and semantic label contexts.

In the second group, people learned a strong unary classifier by leveraging the recent advances of deep learning, such as the Convolutional Neural Network (CNN). With deep models, these works demonstrated encouraging results using simple definition of the pairwise function or even ignore it.

SUMMARY

The following presents a simplified summary of the disclosure in order to provide a basic understanding of some aspects of the disclosure. This summary is not an extensive overview of the disclosure. It is intended to neither identify key or critical elements of the disclosure nor delineate any scope of particular embodiments of the disclosure, or any scope of the claims. Its purpose is to present some concepts of the disclosure in a simplified form as a prelude to the more detailed description that is presented later.

Disclosed is an end-to-end solution for producing per-pixel category label maps for arbitrary-sized raw images in real time. The initial inputs are raw image dataset with ground truth category label maps. Raw image dataset and its category label map annotations are fed into the called "unary term pre-training unit" or the similar unit/module/device, whose output is pre-trained unary term model and its corresponding category label probabilities. Category label probabilities produced by pre-trained unary term model and ground truth category label maps are fed into "pairwise terms pre-training unit" or the similar unit/module/device, whose output is pre-trained pairwise terms model. The concatenation of pre-trained unary term model and pre-trained pairwise terms model, along with raw image dataset and its category label map annotations, are fed into "fine-tuning unit" or the similar unit/module/device whose output is fine-tuned final model. Given any raw images (with arbitrary size) as input, the fine-tuned final model adopts fine-tuned final model to predict per-pixel category label maps.

The end-to-end solution includes a Deep Parsing Network (hereinafter, DPN or second CNN). To train the PDN, several important concepts in training stage are elaborated below:

1. Standard Training: Update the weights of model so that the output of the model (prediction) can approach ground truth annotation iteratively. For example, in semantic image labeling task, the goal of model training is to predict the presence of certain category label (e.g. "pedestrian", "car" etc.) for each pixel that should align with the reality (annotations). Usually, the weights of model are initialized randomly.
2. Pre-training: Pre-training renders the model a good initialization position for further tuning. Thus, pre-trained models usually serve as the starting point for fine-tuning models.

Fine-tuning: Fine-tuning also resembles standard training except that the weights are not initialized randomly, but initialized using the weights in pre-trained model.

In an aspect, disclosed is a method for generating a semantic image labeling model, comprising: forming a first CNN and a second CNN, respectively; randomly initializing the first CNN; inputting a raw image and predetermined label ground truth annotations to the first CNN to iteratively update weights of the first CNN so that category label probabilities output from the first CNN approaches the predetermined label ground truth annotations; randomly initializing the second CNN; inputting the category label probabilities to the second CNN to correct the input category label probabilities so as to determine classification errors of the category label probabilities; updating the second CNN by back-propagating the classification errors; concatenating the updated first CNN and the updated second CNN; classifying each pixel in the raw image into one of a plurality of general object categories; back-propagating classification errors through the concatenated CNN to update weights of the concatenated CNN until the classification errors less than a predetermined threshold.

In another aspect of the present application, disclosed is a method for semantic image labeling. The method comprising: determining category label probabilities for each pixel in an image; determining contextual information for each pixel in spatial domain from the category label probabilities; determining local label contexts for each pixel from the category label probabilities; multiplying the determined contextual information by the determined local label contexts to obtain adjustments to the determined category label probabilities; and applying the adjustments to the category label probabilities to update the category label probabilities.

In another aspect of the present application, disclosed is a system for generating a semantic image labeling model. The system comprising: a unary term pre-training unit, configured for randomly initializing a first CNN; iteratively updating weights of the first CNN based on an inputted raw image and predetermined label ground truth annotations so that category label probabilities output from the first CNN approaches the predetermined label ground truth annotations; a pairwise terms pre-training unit configured for randomly initializing a second CNN; correcting said category label probabilities to determine classification errors of the category label probabilities; and updating the second CNN by back-propagating the classification errors; a fine-tuning unit configured for concatenating the updated first CNN and the updated second CNN; classifying each pixel in the raw image into one of a plurality of general object categories to obtain a classification error; and back-propagating the classification error through the concatenated CNN to update weights of the concatenated CNN until the classification error is less than a predetermined threshold.

In yet another aspect, disclosed is an apparatus for semantic image labeling, comprising: a unary term unit for determining category label probabilities for each pixel in an image; a pairwise terms unit for determining contextual information for each pixel in spatial domain from the category label probabilities; and for determining local label contexts for each pixel from the category label probabilities; and a fine-tuning unit for multiplying the determined contextual information by the determined local label contexts to obtain adjustments to the determined category label probabilities; and applying the adjustments to the category label probabilities to update the category label probabilities.

In yet another aspect, disclosed is an apparatus for semantic image labeling, comprising: a processor; and a memory storing instructions, the instructions when executed by the processor, cause the processor to perform operations, the operations comprising: determining category label probabilities for each pixel in an image; determining contextual information for each pixel in spatial domain from the category label probabilities; and determining local label contexts for each pixel from the category label probabilities; and multiplying the determined contextual information by the determined local label contexts to obtain adjustments to the determined category label probabilities; and applying the adjustments to the category label probabilities to update the category label probabilities.

In one embodiment, the determining contextual information for each pixel in spatial domain from the category label probabilities comprises determining the contextual information for each pixel in spatial domain from the category label probabilities.

In one embodiment, the determining contextual information for each pixel in spatial domain from the category label probabilities comprises computing a similarity relationship of a current reference pixel with its neighboring pixels, wherein, the computed similarity relationship changes for a different reference pixel, the second CNN utilizes a plurality of locally-shared filters to model the similarity relationships, such that similar pixels have similar category labels.

In one embodiment, the second CNN utilizes a plurality of globally-shared filters to model the local label contexts; wherein each globally-shared filter produces a matching cost of the label contexts, and the globally-shared filter with minimum matching cost represents one type of local label context.

In one embodiment, the operations further comprises: randomly initializing a first CNN; iteratively updating weights of the first CNN based on an inputted raw image and predetermined label ground truth annotations so that category label probabilities output from the first CNN approaches the predetermined label ground truth annotations; randomly initializing a second CNN; correcting said category label probabilities to determine classification errors of the category label probabilities; and updating the second CNN by back-propagating the classification errors; concatenating the updated first CNN and the updated second CNN; classifying each pixel in the raw image into one of a plurality of general object categories to obtain a classification error; and back-propagating the classification error through the concatenated CNN to update weights of the concatenated CNN until the classification error is less than a predetermined threshold.

In one embodiment, the second CNN determines contextual information for each pixel in spatial domain from the category label probabilities.

In one embodiment, the second CNN computes a similarity relationship of a current reference pixel in the image with its neighboring pixels, wherein, the computed similarity relationship changes for a different reference pixel, the second CNN utilizes a plurality of locally-shared filters to update the similarity relationships, such that similar pixels have similar category labels.

In one embodiment, the second CNN utilizes a plurality of globally-shared filters to update local label contexts of the pixels; wherein each globally-shared filter produces a matching cost of the label contexts, and the globally-shared filter with minimum matching cost represents one type of local label context.

In yet another aspect, disclosed is a computer program product, comprising a computer readable code, wherein when the computer readable code is run on a device, a processor in the device executes an instruction for implementing each step in the method for generating a semantic image labeling model according to the aspects described above.

In yet another aspect, disclosed is anon-transitory computer readable storage medium for storing a computer readable instruction, wherein when the instruction is executed, an operation of each step in the method for generating a semantic image labeling model according to the aspects described above is implemented.

BRIEF DESCRIPTION OF THE DRAWINGS

Exemplary non-limiting embodiments of the present disclosure are described below with reference to the attached drawings. The drawings are illustrative and generally not to an exact scale. The same or similar elements on different figures are referenced with the same reference numbers.

DETAILED DESCRIPTION

Reference will now be made in detail to some specific embodiments of the disclosure. Examples of these specific embodiments are illustrated in the accompanying drawings. While the disclosure is described in conjunction with these specific embodiments, it will be understood that it is not intended to limit the disclosure to the described embodiments. On the contrary, it is intended to cover alternatives, modifications, and equivalents as may be included within the spirit and scope of the disclosure as defined by the appended claims. In the following description, numerous specific details are set forth in order to provide a thorough understanding of the present disclosure. The present disclosure may be practiced without some or all of these specific details. In other instances, well-known process operations have not been described in detail in order not to unnecessarily obscure the present disclosure.

The terminology used herein is to describe particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Figure 1:
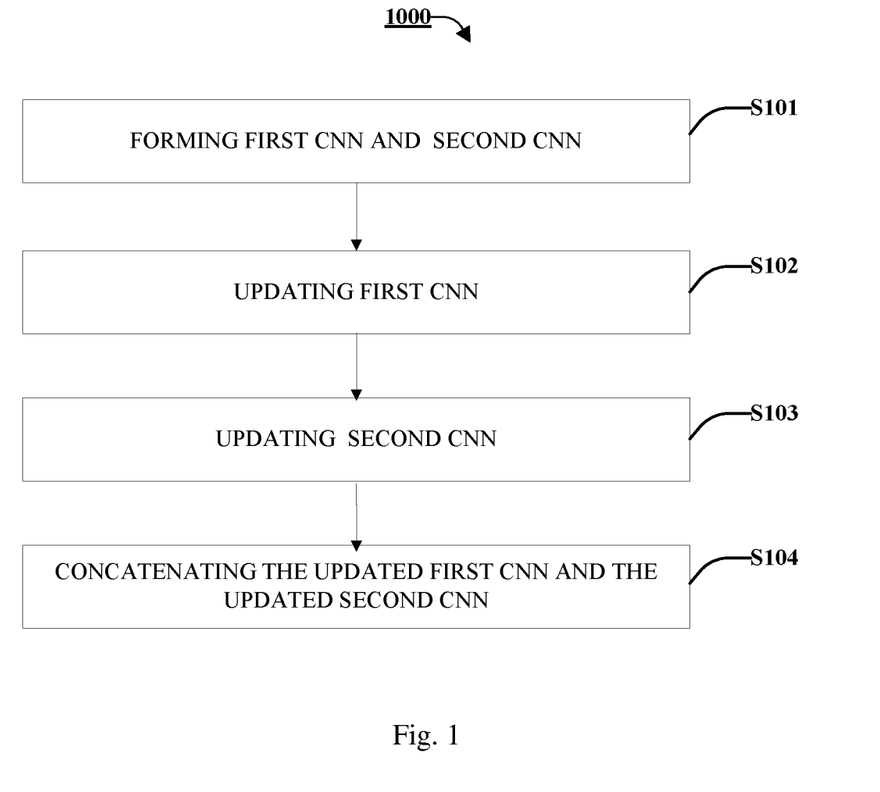
FIG. 1 illustrates a method for generating a semantic image labeling model according to one embodiment of the present application.

FIG. 1 illustrates method 1000 for generating a semantic image labeling model according to an embodiment of the present application. The generated semantic image labeling model may be sued for predicting category label for each pixel in an image. Specifically, the goal of the generated model is to automatically output a label map which segments the original image into several semantic parts. It has large application potentials in intelligent home, autonomous driving, image editing etc. For example, in intelligent home the semantic parts are 'sofa', 'chair' and 'dining table', while in autonomous driving the semantic parts will be 'sky', 'building', 'pedestrian', 'car' and 'road'.

As shown, at step S101, a first CNN and a second CNN will be formed, respectively. The formed first CNN may be any one of the conventional CNN comprising at least one convolutional layers and at least one pooling layer. As the convolutional layers and the pooling layer are well known in the art, the detailed description thereof will be omitted herein.

At step S102, the formed first CNN is randomly initialized, a raw image and their corresponding predetermined label ground truth annotations are input to the first CNN to iteratively update weights of the first CNN so that category label probabilities output from the first CNN approaches the predetermined label ground truth annotations, which will be further discussed in reference to the embodiment shown in FIG. 2 below.

At step S103, the second CNN is randomly initialized, the category label probabilities are input to the second CNN to correct the input category label probabilities so as to determine classification errors of the category label probabilities; and the second CNN is updated by back-propagating the classification errors, which will be further discussed in reference to the embodiment shown in FIG. 3 below.

Figure 4:
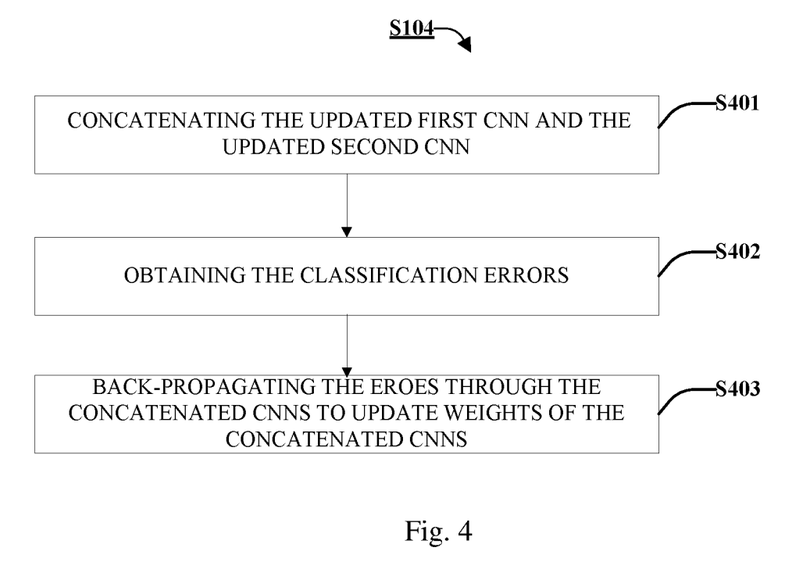
FIG. 4 illustrates a detailed process for step S104 according to an embodiment of the present application.

At step S104, the process 1000 concatenates the updated first CNN and the updated second CNN, classifies each pixel in the raw image into one of a plurality of general object categories, and back-propagate classification errors through the concatenated CNN to update weights of the concatenated CNN until the classification errors less than a predetermined threshold.

Figure 2:
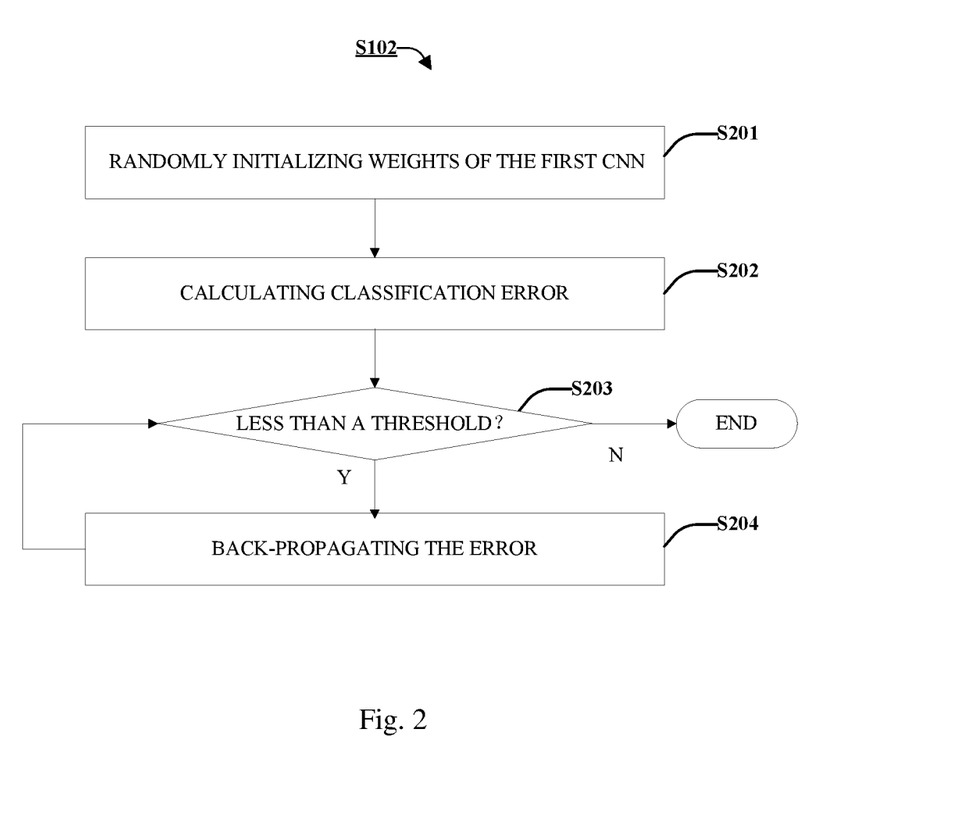
FIG. 2 illustrates a detailed process for step S102 detection according to an embodiment of the present application.

FIG. 2 illustrates a process for step S102 according to an embodiment of the present application. In the present embodiment, different supervisions may be utilized in different training settings. In each training setting, only one supervision is employed. As example, different training strategies are illustrated below 1. Per-pixel category label maps as supervision:
   In this setting, it can naturally adjust network parameters according to the ground truth category label maps, so as to make accurate per-pixel predictions.
2. Category bounding boxes as supervision:
   Since category bounding boxes indicate the presence of certain object in region-level, it can view them as coarse category label maps supervision. Unary term trained in this way yields good localization performance on label maps produced.
3. Image-level tags as supervision:
   When the unary term is trained with the task of image-level tag prediction (by adding additional classification layers), the top layer of unary term has high response on object locations. And those response maps can be easily adapted as the output of unary term.
4. Image-level descriptive sentences as supervision:
   First, a recurrent neural network (RNN) is utilized to transform descriptive sentences into latent image-level tags. Then, the subsequent training strategy is similar to the above one.

The following description just takes "Category Label Map Supervision" as an example. The other supervisions could be used in a similar way.

At step S201, the weights of the first CNN will be randomly initialized. At step S202, a raw image and its corresponding label ground truth annotation are input to the first CNN. The CNN operates to classify each pixel in the input image into one of N general object categories, compares each of the classified object category with the corresponding label ground truth annotation so as to calculate a classification error, i.e., the difference between the classified object category and the corresponding predetermined label ground truth annotation.

At step S203, it is determined if the calculated classification error is less than a predetermined threshold, if not, at step S204, the classification error will be back-propagated through the first CNN to update the weights, until a newly calculated classification error is less than the predetermined threshold.

The embodiment of the present application is an end-to-end solution which integrates direct label prediction (unary term) and contextual label refinement (pairwise terms) in a seamless way, thus can be jointly optimized and forming a simple yet powerful solution. To this end, a second CNN is proposed to get rich contextual information. In particular, the second CNN considers contextual information both in spatial domain (triple penalty) and label domain (local label contexts), thus achieving state-of-the-art performance. Specifically, the second CNN adopts locally-shared filters to calculate triple penalty. Mixture of globally-shared filters and block minimum pooling are utilized to model local label contexts.

In one embodiment of the present application, the second CNN (herein, also referred to "pairwise term model") is a novel deep learning architecture comprising triple penalty layer (locally-shared filters), local label contexts layer (mixture of globally-shared filters) and block minimum pooling layer. The final model is just the concatenation of unary term model and pairwise terms model.

Filters are parameters of network which are applied on input data and result in output data. Locally-shared filters possess different parameters in different positions while globally-shared filters have the same parameters across different positions.

Locally-Shared Filters

In the second CNN (herein, also referred as "pairwise terms model"), it adopts locally-shared filters to calculate triple penalty. The intuition behind triple penalty is that similar pixels (e.g. both are blue) should have similar category labels (e.g. 'sky'). To perform this, the second CNN has to compute the similarity relationship of the current reference pixel with its neighboring pixels. And when the second CNN considers a different reference pixel, the similarity relationship changes as well. That is why locally-shared filters (which possess different parameters in different positions) are utilized to model this kind of similarity relationships.

Mixture of Globally-Shared Filters:

In the pairwise terms model, the mixture of globally-shared filters are adopted to model local label contexts. The intuition behind local label contexts is that labels have certain co-occurrences (e.g. 'sky' and 'plane' are more likely to be present together) and configurations (e.g. 'person' are more likely to be above 'motorcycle'). Because these kinds of label contexts are shared across different positions of an image, globally-shared filters are utilized to model them. To further enhance the modeling capacity, more globally-shared filters are included to form mixture. (Each globally-shared filter captures one type of local label contexts; and more globally-shared filters are able to capture various types of local label contexts.) In this way, rich label contexts can be captured.

Block Minimum Pooling:

As stated above, mixture of globally-shared filters is adopted to model label contexts. Each globally-shared filter in mixture produces a matching cost of label contexts with respect to input. And the globally-shared filter with minimum matching cost is just the label contexts to be sought. To find this corresponding globally-shared filter, block minimum pooling is employed. This pooling operation takes the matching costs of all globally-shared filters as inputs and picks out the minimum one. In this way, the corresponding label contexts could be obtained.

Figure 3:
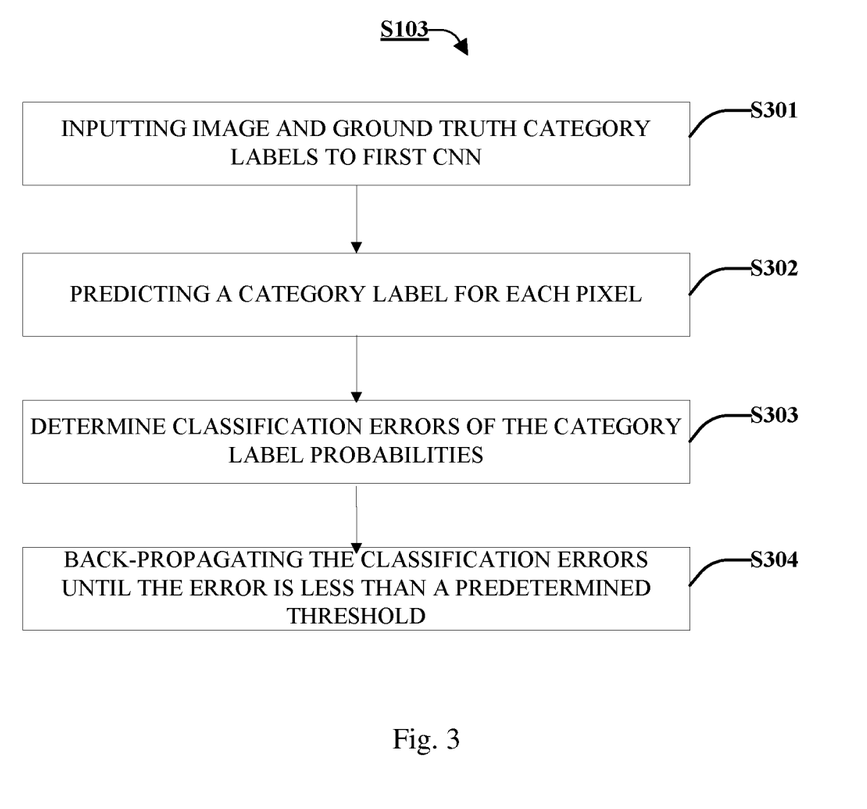
FIG. 3 illustrates a detailed process for step S103 according to an embodiment of the present application.

FIG. 3 illustrates a detailed process for step S103 according to an embodiment of the present application.

At step S301, it receives an image and ground truth category labels, which refer to semantic objects such as "sky", "person" etc., as input to the first CNN.

At step S302, the first pre-trained CNN compare each pixel in the received image with the ground truth category labels, so as to predict a category label for each pixel in the received image to obtain category label probabilities for each pixel in the image, the probabilities represents the confidence that the certain label was assigned to this pixel. For example, if the category label probabilities for one pixel are 0.8 ("person") and 0.2 ("sky"), then a much larger confidence will be used to classify this pixel as "person".

At step S303, the ground truth category labels and the obtained category label probabilities are fed into the randomly initialized second CNN (PDN). The second CNN corrects the input category label probabilities so as to determine classification errors of the category label probabilities. Each model here will output its own category label probabilities. And all the classification decisions are made by referring to the corresponding category label probabilities. For example, if the category label probabilities for one pixel are 0.8 ("person") and 0.2 ("sky"), then this pixel is classified as "person". And classification errors are obtained by comparing predicted labels with ground truth labels on all pixels in image. The second CNN updates its weights to make correct predictions by adjusting the probabilities produced by the first CNN. For instance, if the category label for the above pixel is actually "sky", then this classification error will guide the second CNN to increase the probability of "sky" and decrease the probability of "person", e.g. to 0.4 ("person") and 0.6 ("sky"). In this case, the final classification result will be "sky", which is more aligned with ground truth label. Please note that the second CNN basically determines the adjustments to the probabilities produced by the first CNN (here the adjustments are −0.4 for "person" and +0.4 for "sky").

At step S304, it updates the second CNN by back-propagating the classification errors until the error is less than a predetermined threshold, which is well known in the art.

FIG. 4 illustrates a detailed process for step S104 according to an embodiment of the present application.

At step S401, it concatenates the updated first CNN ("unary term model") and the updated second CNN ("pairwise terms model");

At step S402, each pixel in the raw image is classified into one of a plurality of general object categories, and each classified object is compared with the corresponding ground truth to obtain the classification errors. In particular, classification error of each pixel is obtained by comparing predicted category label (classified general object categories) with the ground truth category label. If they are aligned, there will be no classification error (i.e. 0); otherwise, there will exist classification error (i.e. 1). In the end, classification errors of all pixels in image are calculated.

At step S403, the classification errors are back-propagated through the concatenated CNNs to update weights of the concatenated CNNs until the classification errors less than a predetermined threshold.

Figure 5:
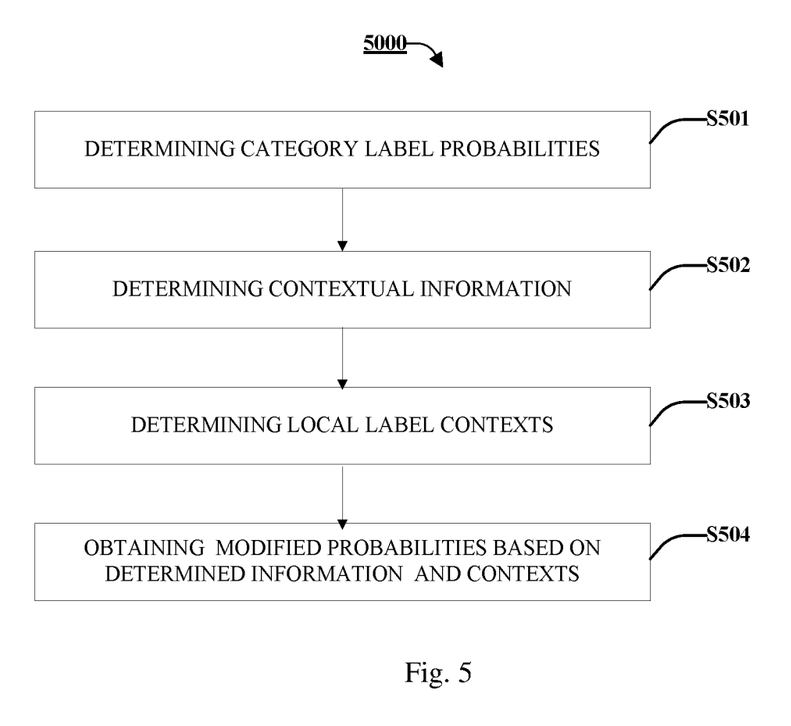
FIG. 5 illustrates a detailed process for a method for semantic image labeling according to one embodiment of the present application.

Hereinafter, a method 5000 for semantic image labeling according to one embodiment of the present application will be discussed in reference with FIG. 5.

At step S501, given an input raw image, it determines category label probabilities for each pixel in the image by the concatenated two CNNs as discussed in step S403. In one embodiment of the present application, the category label probabilities for each pixel in the image may be determined by the first CNN of the concatenated CNN.

At step S502, it determines contextual information for each pixel in spatial domain (triple penalty) from the category label probabilities by the concatenated two CNNs.

At step S503, it determines local label contexts for each pixel from the category label probabilities, and at step S504, it multiplies the determined contextual information by the determined local label contexts to obtain adjustments to the probabilities produced by the first CNN. The modified probabilities are obtained by applying the adjustments to the original probabilities. The final labeling results are determined by referring to the modified probabilities.

Figure 6:
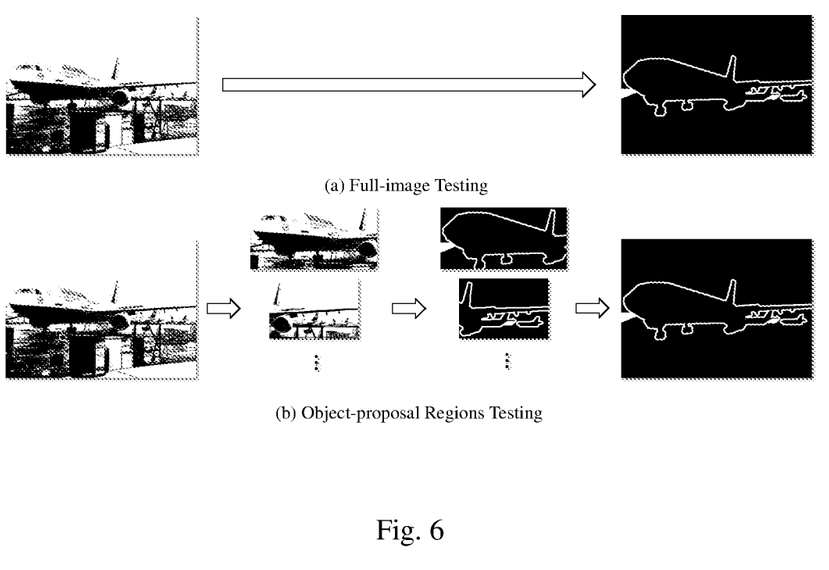
FIG. 6 illustrates the full-image prediction/testing according to one embodiment of the present application.

The method 5000 may take any raw full image as input and fed into the fine-tuned final model (DPN). In particular, object proposals regarding various image regions are first extracted. Then, each object proposal is fed into DPN to get its corresponding region label map. The final result is obtained by combining all these region label maps into full-image label map. For clarity, the full-image prediction/testing is demonstrated in FIG. 6, in which (a) illustrates a full image prediction/testing and (b) illustrates object-proposal regions prediction/testing, but please note that it could naturally be extended to other testing strategies.

Figure 7:
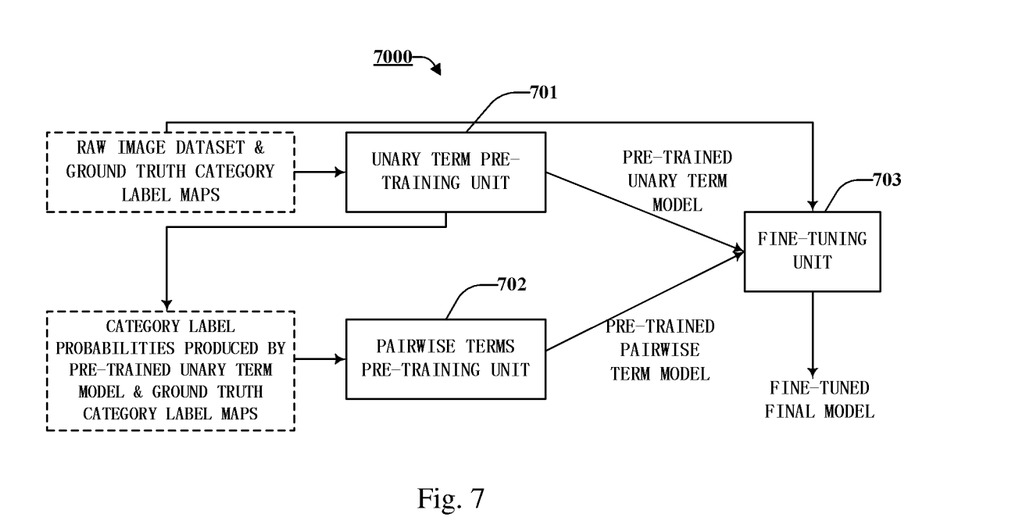
FIG. 7 is a schematic diagram illustrating a system for generating a semantic image labeling model according to one embodiment of the present application.

FIG. 7 is a schematic diagram illustrating a system 7000 for generating a semantic image labeling model according to one embodiment of the present application.

As shown, the system 7000 for generating a semantic image labeling model may comprise a unary term pre-training unit 701, a pairwise terms pre-training unit 702 and a fine-tuning unit 703.

The unary term pre-training unit 701 is configured to randomly initialize the first CNN; iteratively update weights of the first CNN based on an inputted raw image and predetermined label ground truth annotations by back-propagating the classification errors. Herein, the classification errors are obtained by comparing predicted label and ground truth label/annotation during pre-training. In each iteration of pre-training, there are classification errors calculated for updating weights. After convergence, the category label probabilities for each image will be obtained by feeding forward the corresponding raw image into the first CNN with the updated weights, i.e. category label probabilities are just the outputs of the first CNN.

The pairwise terms pre-training unit 702 is configured for randomly initializing a second CNN; correcting said category label probabilities to determine classification errors of the category label probabilities; and updating the second CNN by back-propagating the classification errors as discussed in reference with FIG. 3.

The fine-tuning unit configured 703 is configured for concatenating the updated first CNN and the updated second CNN; classifying each pixel in the raw image into one of a plurality of general object categories to obtain a classification error; and back-propagating the classification error through the concatenated CNN to update weights of the concatenated CNN until the classification errors less than a predetermined threshold, which has been discussed in reference with FIG. 4.

As stated in the above, the second CNN may be configured to determine contextual information for each pixel in spatial domain (triple penalty) from the category label probabilities. The pairwise terms pre-training unit 702 may be configured to compute a similarity relationship of a current reference pixel in the image with its neighboring pixels. For a different reference pixel, the computed similarity relationship changes as well. The pairwise terms pre-training unit 702 may utilize a plurality of locally-shared filters (which possess different parameters in different positions of pixels in the image) to model the similarity relationships, such that similar pixels (e.g. both are blue) should have similar category labels, and utilize a plurality of globally-shared filters (which possess the same parameters in different positions of pixels in the image) to update/model local label contexts of the pixels; wherein each globally-shared filter produces a matching cost of the label contexts, and the globally-shared filter with minimum matching cost represents one type of the local label context.

Figure 8:
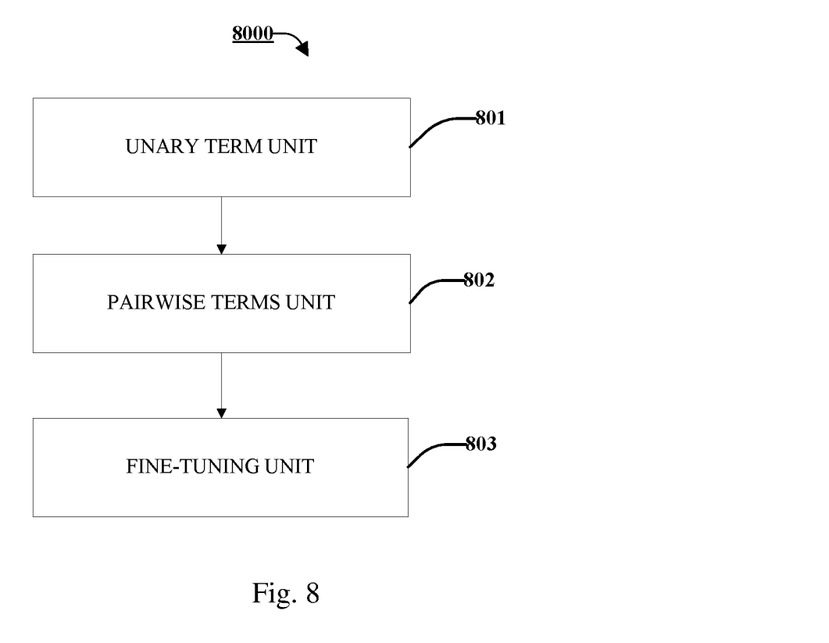
FIG. 8 is a schematic diagram illustrating an apparatus for semantic image labeling, according to one embodiment of the present application.

FIG. 8 is a schematic diagram illustrating apparatus 8000 for semantic image labeling, according to one embodiment of the present application.

As shown, the apparatus 8000 for semantic image labeling may comprise: a unary term unit 801 for determining category label probabilities for each pixel in an image; a pairwise terms unit 802 for determining contextual information for each pixel in spatial domain (triple penalty) from the fed category label probabilities; and for determining local label contexts for each pixel from the fed category label probabilities; and a fine-tuning unit 803 for multiplying the determined contextual information by the determined local label contexts to obtain the adjustments to the probabilities produced by the first CNN. The modified probabilities are obtained by applying the adjustments to the original probabilities. The final labeling results are determined by referring to the modified probabilities. In the embodiment, the fine-tuning unit 803 is also configured for unifying unary term unit 801 and pairwise terms unit 802 into an end-to-end system. The weights of both unary term unit and pairwise terms unit are updated simultaneously. Thus, the unary term component and pairwise terms component could act more collaboratively and more effectively.

In one embodiment of the present application, the pairwise terms unit 802 is further configured for determining the contextual information for each pixel in spatial domain (triple penalty) from the fed category label probabilities. The pairwise terms unit 802 may be further configured to compute a similarity relationship of a current reference pixel with its neighboring pixels. For a different reference pixel, the computed similarity relationship changes as well. In one embodiment of the present application, the pairwise terms unit 802 utilizes a plurality of locally-shared filters (which possess different parameters in different positions of pixels in the image) to model the similarity relationships, such that similar pixels (e.g. both are blue) should have similar category labels. The pairwise terms unit 802 may further utilize a plurality of globally-shared filters (which possess the same parameters in different positions of pixels in the image) to update/model the local label contexts; wherein each globally-shared filter produces a matching cost of the label contexts, and the globally-shared filter with minimum matching cost is just the label contexts.

Figure 9:
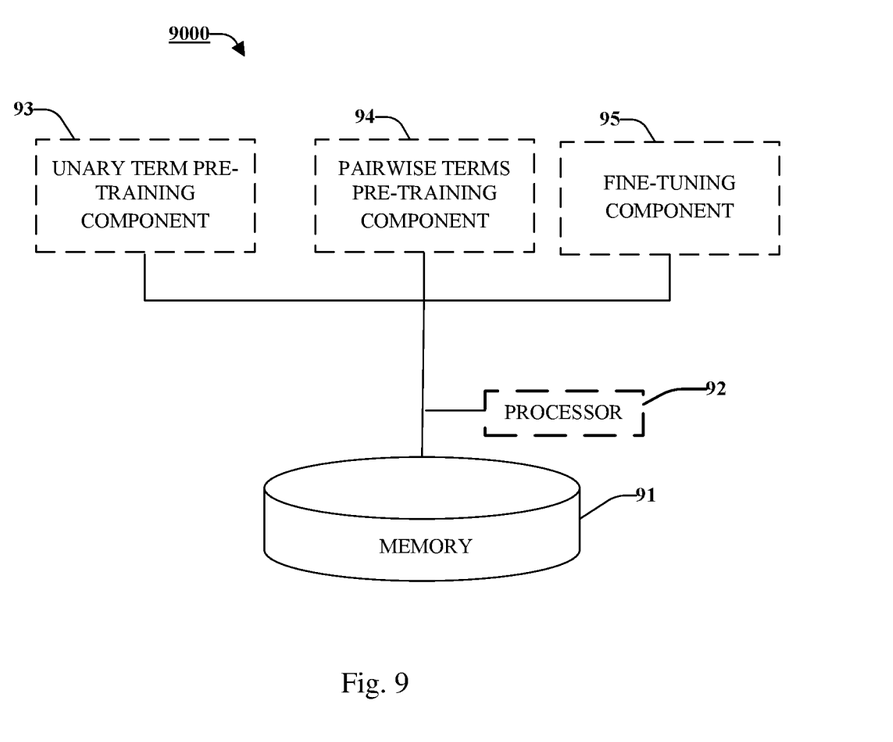
FIG. 9 illustrates a system for generating a semantic image labeling model consistent with an embodiment of the present application.

FIG. 9 illustrates a system 9000 for generating a semantic image labeling model consistent with an embodiment of the present application. In this embodiment, the process as shown in FIG. 1 can be implemented by software in the system 9000. Referring to FIG. 9, the system 9000 comprises a memory 91 that stores executable components and a processor 92, electrically coupled to the memory 91 to execute the executable components to perform operations of the system 9000. The executable components may comprise: a unary term pre-training component 93 configured for randomly initializing a first CNN; iteratively updating weights of the first CNN based on an inputted raw image and predetermined label ground truth annotations so that category label probabilities output from the first CNN approaches the predetermined label ground truth annotations; and a pairwise terms pre-training component 94 configured for randomly initializing a second CNN; correcting said category label probabilities to determine classification errors of the category label probabilities; and updating the second CNN by back-propagating the classification errors. The executable components may further comprise a fine-tuning component 95 configured for concatenating the updated first CNN and the updated second CNN; classifying each pixel in the raw image into one of a plurality of general object categories; and back-propagating classification errors through the concatenated CNN to update weights of the concatenated CNN until the classification errors less than a predetermined threshold. In the embodiment, the second CNN is configured to determine contextual information for each pixel in spatial domain (triple penalty) from the category label probabilities. The pairwise terms pre-training component is configured to compute a similarity relationship of a current reference pixel in the image with its neighboring pixels. For a different reference pixel, the computed similarity relationship changes as well. The pairwise terms pre-training component utilizes a plurality of locally-shared filters to update/model the similarity relationships, such that similar pixels should have similar category labels. The pairwise terms pre-training component utilizes a plurality of globally-shared filters (which possess the same parameters in different positions of pixels in the image) to model local label contexts of the pixels; wherein each globally-shared filter produces a matching cost of the label contexts, and the globally-shared filter with minimum matching cost represents one type of local label context.

Figure 10:
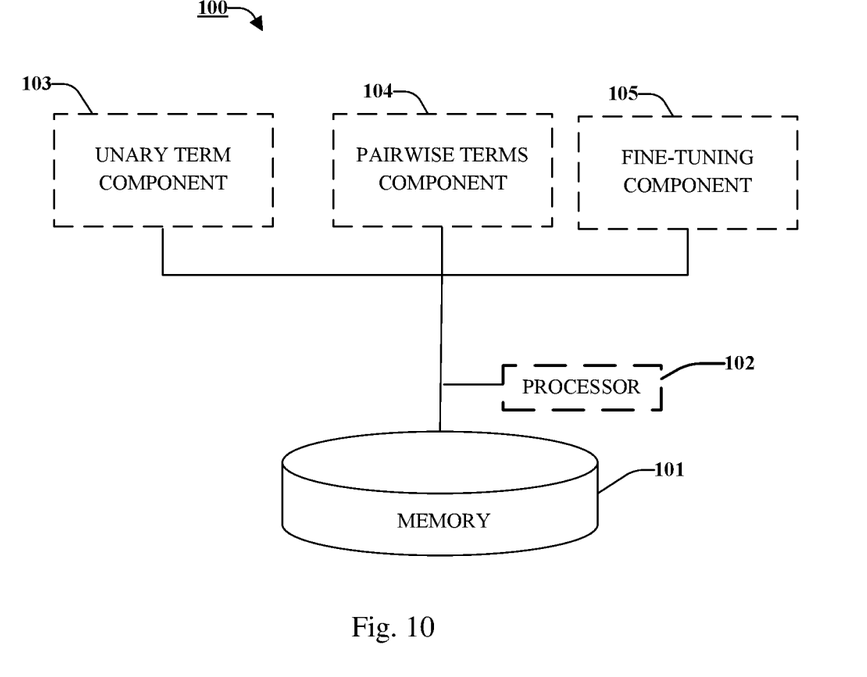
FIG. 10 illustrates a system for generating a semantic image labeling consistent with an embodiment of the present application.

FIG. 10 illustrates a system 100 for generating a semantic image labeling consistent with an embodiment of the present application. In this embodiment, the process as shown in FIG. 5 can be implemented by software in the system 100. Referring to FIG. 10, the system 100 comprises a memory 101 that stores executable components and a processor 102 electrically coupled to the memory 101 to execute the executable components to perform operations of the system 100. The executable components may comprise: a unary term component 103 for determining category label probabilities for each pixel in an image; a pairwise terms component 104 for determining contextual information for each pixel in spatial domain (triple penalty) from the fed category label probabilities; and for determining local label contexts for each pixel from the fed category label probabilities; and a fine-tuning component 105 for multiplying the determined contextual information by the determined local label contexts to obtain the adjustments to the probabilities produced by the first CNN. The modified probabilities are obtained by applying the adjustments to the original probabilities. The final labeling results are determined by referring to the modified probabilities. In addition, the fine-tuning component 105 is also configured for unifying unary term component and pairwise terms component into an end-to-end system. The weights of both unary term component and pairwise terms component are updated simultaneously. Thus, unary term component and pairwise terms component could act more collaboratively and more effectively.

The pairwise terms component 103 is further configured for determining the contextual information for each pixel in spatial domain (triple penalty) from the fed category label probabilities.

The pairwise terms component 104 is further configured to compute a similarity relationship of a current reference pixel with its neighboring pixels. For a different reference pixel, the computed similarity relationship changes as well. The pairwise terms component 104 utilizes a plurality of locally-shared filters to model the similarity relationships, such that similar pixels have similar category labels. The pairwise terms component 104 utilizes a plurality of globally-shared filters to model the local label contexts. Each globally-shared filter produces a matching cost of the label contexts, and the globally-shared filter with minimum matching cost represents one type of local label context.

As will be appreciated by one skilled in the art, the present disclosure may be embodied as a system, a method or a computer program product. Accordingly, the present disclosure may take the form of an entirely hardware embodiment and hardware aspects that may all generally be referred to herein as a "unit", "circuit," "module" or "system." Much of the inventive functionality and many of the inventive principles when implemented, are best supported with or integrated circuits (ICs), such as a digital signal processor and software therefore or application specific ICs. It is expected that one of ordinary skill, notwithstanding possibly significant effort and many design choices motivated by, for example, available time, current technology, and economic considerations, when guided by the concepts and principles disclosed herein will be readily capable of generating ICs with minimal experimentation. Therefore, in the interest of brevity and minimization of any risk of obscuring the principles and concepts according to the present disclosure, further discussion of such software and ICs, if any, will be limited to the essentials with respect to the principles and concepts used by the embodiments.

In addition, the present disclosure may take the form of an entirely software embodiment (including firmware, resident software, micro-code, etc.) or an embodiment combining software. Furthermore, the present disclosure may take the form of a computer program product embodied in any tangible medium of expression having computer-usable program code embodied in the medium.

Although many examples of the present application have been described, those skilled in the art can make variations or modifications to these examples upon knowing the basic inventive concept. The appended claims are intended to be considered as comprising the examples and all the variations or modifications fell into the scope of the present application.

Obviously, those skilled in the art can make variations or modifications to the present application without departing the scope of the present disclosure. As such, if these variations or modifications belong to the scope of the claims and equivalent technique, they may also fall into the scope of the present disclosure.

What is claimed is:

1. A method for generating a semantic image labeling model, comprising:
    forming a first Convolutional Neural Network (CNN) and a second CNN, respectively, the first CNN being different from the second CNN;
    training the first CNN by:
    randomly initializing the first CNN; and
    inputting a raw image and a plurality of predetermined label ground truth annotations to the first CNN to iteratively update weights of the first CNN so that a category label probability for the raw image, which is output from the first CNN, approaches the predetermined label ground truth annotations; wherein the first CNN is trained by utilizing one item of: per-pixel category label maps, category bounding boxes, image-level tags, or image-level descriptive sentences as a supervision;
    training the second CNN by:
    randomly initializing the second CNN;
    inputting the category label probability to the second CNN to correct the input category label probability so as to determine classification errors of the category label probabilities; and
    updating the second CNN by back-propagating the classification errors;
    concatenating the updated first CNN and the updated second CNN;
    classifying each pixel in the raw image into one of a plurality of general object categories; and
    back-propagating classification errors through the concatenated CNN to update weights of the concatenated CNN until the classification errors less than a predetermined threshold,
    wherein the second CNN is configured to determine contextual information for each pixel in spatial domain (triple penalty) from the category label probability.

2. The method of claim 1, wherein the second CNN is configured to compute a similarity relationship of a current reference pixel in the image with its neighboring pixels,
wherein, the computed similarity relationship changes for a different reference pixel,
the second CNN utilizes a plurality of locally-shared filters to update the similarity relationships, such that similar pixels have similar category labels.

3. The method of claim 2, wherein the second CNN utilizes a plurality of globally-shared filters to update local label contexts of the pixels; wherein each globally-shared filter produces a matching cost of the label contexts, and the globally-shared filter with minimum matching cost represents one type of local label context.

4. A method for semantic image labeling, comprising:
determining, by a first pre-trained Convolutional Neural Network (CNN), category label probabilities for each pixel in an image;
determining, by a second pre-trained CNN, contextual information for each pixel in spatial domain from the category label probabilities based on a similarity relationship of a current reference pixel with its neighboring pixels;
determining local label contexts for each pixel from the category label probabilities, the local label contexts being shared across different positions of the image;
multiplying the determined contextual information by the determined local label contexts to obtain adjustments to the determined category label probabilities; and
applying the adjustments to the category label probabilities to update the category label probabilities.

5. The method of claim 4, wherein the first CNN comprises at least one convolutional layer and at least one pooling layer,
wherein, the first CNN is trained by:
initializing weights of each of the layers randomly;
classifying each pixel in the image into one of a plurality of general object categories to calculate a classification error; and
back-propagating iteratively the classification error through the first CNN to update the weights, until a newly calculated classification error is less than a predetermined threshold.

6. The method of claim 4, wherein
the second pre-trained CNN has a different architecture from the first CNN.

7. The method of claim 6, wherein the method further comprises training the second CNN by:
receiving an image and ground truth category labels;
using a first pre-trained CNN to compare each pixel in the received image with the ground truth category labels so as to predict a category label for each pixel in the received image to obtain category label probabilities that the certain label was assigned to this pixel; and
feeding the ground truth category labels and the obtained category label probabilities into the second pre-trained CNN to update the second CNN.

8. The method of claim 7, further comprising:
concatenating the updated first CNN and the updated second CNN;
classifying each pixel in the raw image into one of a plurality of general object categories to obtain a classification error; and
back-propagating classification errors through the concatenated CNN to update weights of the concatenated CNN until the classification error is less than a predetermined threshold.

9. The method of claim 4, wherein the determining contextual information for each pixel in spatial domain from the category label probabilities further comprise:
computing a similarity relationship of a current reference pixel with its neighboring pixels,
wherein,
the computed similarity relationship changes for a different reference pixel,
the second CNN utilizes a plurality of locally-shared filters to update the similarity relationships, such that similar pixels should have similar category labels.

10. The method of claim 9, wherein in the determining local label contexts for each pixel from the category label probabilities, the second CNN utilizes a plurality of globally-shared filters to update the local label contexts; wherein each globally-shared filter produces a matching cost of the label contexts, and the globally-shared filter with minimum matching cost is just the label contexts.

11. An apparatus for semantic image labeling, comprising:
a processor; and
a memory storing instructions, the instructions when executed by the processor, cause the processor to perform operations, the operations comprising:
determining, by a first pre-trained Convolutional Neural Network (CNN), category label probabilities for each pixel in an image;
determining, by a second pre-trained CNN, contextual information for each pixel in spatial domain from the category label probabilities based on a similarity relationship of a current reference pixel with its neighboring pixels; and determining local label contexts for each pixel from the category label probabilities, the local label contexts being shared across different positions of the image; and
multiplying the determined contextual information by the determined local label contexts to obtain adjustments to the determined category label probabilities; and applying the adjustments to the category label probabilities to update the category label probabilities.

12. The apparatus of claim 11, wherein the determining contextual information for each pixel in spatial domain from the category label probabilities comprises computing a similarity relationship of a current reference pixel with its neighboring pixels,
wherein, the computed similarity relationship changes for a different reference pixel,
the second CNN utilizes a plurality of locally-shared filters to model the similarity relationships, such that similar pixels have similar category labels.

13. The apparatus of claim 12, wherein the second CNN utilizes a plurality of globally-shared filters to model the local label contexts; wherein each globally-shared filter produces a matching cost of the label contexts, and the globally-shared filter with minimum matching cost represents one type of local label context.

14. The apparatus of claim 11, wherein the operations further comprise:
randomly initializing a first CNN; iteratively updating weights of the first CNN based on an inputted raw image and predetermined label ground truth annotations so that category label probabilities output from the first CNN approaches the predetermined label ground truth annotations;
randomly initializing a second CNN; correcting said category label probabilities to determine classification errors of the category label probabilities; and updating the second CNN by back-propagating the classification errors;

concatenating the updated first CNN and the updated second CNN; classifying each pixel in the raw image into one of a plurality of general object categories to obtain a classification error; and back-propagating the classification error through the concatenated CNN to update weights of the concatenated CNN until the classification error is less than a predetermined threshold.

15. The apparatus of claim 14, wherein the second CNN determines contextual information for each pixel in spatial domain from the category label probabilities.

16. The apparatus of claim 14, wherein the second CNN computes a similarity relationship of a current reference pixel in the image with its neighboring pixels, wherein, the computed similarity relationship changes for a different reference pixel, the second CNN utilizes a plurality of locally-shared filters to update the similarity relationships, such that similar pixels have similar category labels.

17. A non-transitory computer readable storage medium for storing a computer readable instruction, wherein when the instruction is executed, an operation of each step in the method for semantic image labeling according to claim 4 is implemented.

* * * * *